(12) United States Patent
Guldbrandsen et al.

(10) Patent No.: US 6,472,025 B1
(45) Date of Patent: Oct. 29, 2002

(54) METHOD FOR PRODUCING A COATING OF SOLVENT-FREE PRESSURE-SENSITIVE ADHESIVE SYSTEMS ON ESPECIALLY RELEASE-COATED SUBSTRATES IN CONJUNCTION WITH CROSSLINKING OF THE PRESSURE-SENSITIVE ADHESIVE SYSTEM

(75) Inventors: Lars Guldbrandsen, Hamburg; Ralf Hirsch, Quickborn; Dieter Müller, Kutenholz-Mulsum; Hermann Neuhaus-Steinmetz, Ahrensburg; Stefan Schulz, Hamburg; Jörg Speer, Brokstedt, all of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/937,743

(22) PCT Filed: Feb. 10, 2000

(86) PCT No.: PCT/EP00/01060
§ 371 (c)(1),
(2), (4) Date: Nov. 29, 2001

(87) PCT Pub. No.: WO00/47684
PCT Pub. Date: Aug. 17, 2000

(30) Foreign Application Priority Data

Feb. 12, 1999 (DE) .......................................... 199 05 934

(51) Int. Cl.$^7$ .................................................. C08F 2/46
(52) U.S. Cl. .................... 427/487; 427/208.4; 427/299; 427/428; 427/505; 427/516; 427/551; 427/553
(58) Field of Search ............................ 427/487, 208.4, 427/299, 428, 505, 516, 551, 553

(56) References Cited

U.S. PATENT DOCUMENTS 4,571,351 A   2/1986   Schaetti ........................ 427/288

FOREIGN PATENT DOCUMENTS

| DE | 43 16 317 | 11/1994 | .............. C09J/7/00 |
| EP | 0 265 673 | 5/1988 | .............. C09J/3/14 |
| EP | 0 453 254 | 10/1991 | .............. C09J/7/02 |

*Primary Examiner*—Bernard Pianalto
(74) *Attorney, Agent, or Firm*—Norris McLaughlin & Marcus

(57) ABSTRACT

A method of producing a coating of solvent-free pressure-sensitive adhesive systems on substrates, especially release-coated substrates, in which the pressure-sensitive adhesive system is applied in one or more layers to a rotating roller by means of an adhesive applicator, the pressure-sensitive adhesive system on the roller is crosslinked in an irradiating means by means of high-energy radiation, and the roller is contacted with the substrate, so that the pressure-sensitive adhesive system is transferred from the roller to the substrate.

11 Claims, 1 Drawing Sheet

METHOD FOR PRODUCING A COATING OF SOLVENT-FREE PRESSURE-SENSITIVE ADHESIVE SYSTEMS ON ESPECIALLY RELEASE-COATED SUBSTRATES IN CONJUNCTION WITH CROSSLINKING OF THE PRESSURE-SENSITIVE ADHESIVE SYSTEM

The invention concerns a method of producing a coating of solvent-free pressure-sensitive adhesive (PSA) systems on substrates, especially release-coated substrates, the operation of coating running by way of a roller. While the PSA system is on the roller, the applied adhesive film is crosslinked using electron beams (EB), UV or IR rays.

From the prior art it is known that in order to obtain PSA films possessing high shear resistance it is preferable to employ acrylic PSAs which are crosslinked by methods which include physical methods. In the case of EB and UV radiation, the desired product properties are adjusted by way of the radiation dose; in the case of IR radiation, by way of the product temperature and the residence time.

According to the methods known to date, PSA films are coated directly or indirectly onto release-coated or non-release-coated substrates with the aid, inter alia, of multi-roller applicators, single-manifold, slot or multiple-manifold dies and are then subjected to the crosslinking operation.

For products comprising a coating to be crosslinked, which may be a PSA, for example, and a radiation-degradable backing, such as paper, cellulose wovens or nonwovens, and PP films, for example, it is possible to minimize the damage by optimizing the accelerating voltage. When this is done, the backing receives a significantly lower average dose than the coating, while the fall in dose in the coating remains within acceptable limits.

Relationships of this kind are described, inter alia, in EP 0 453 254 B (Yarosso et al.) and also in the paper accompanying a lecture given by Dr. Karmann at the 7th Munich Adhesives and Finishing seminar, 1982.

As a basis for the calculation there is used, for example, the following empirical formula, which was published by Neuhaus-Steinmetz at RadTech Europe, Mediterraneo 1993.

$$D[\%] = \frac{\exp\left\{-\left(\frac{18.8*X}{(U_B)^{1.57}} - 0.7\right)^2\right\}}{1 + \left(\frac{9.7*X}{(U_B)^{1.57}}\right)^{15}}$$

where
D is the dose in %
UB is the accelerating voltage in kV
X is the irradiated weight per unit area in g/m², consisting of the weight per unit area of the vacuum window, the air gap between vacuum window and product, and the depth in the product A double-sided adhesive tape consisting of a backing with the adhesive compositions, intended for crosslinking, on both sides and of an antiadhesively treated release liner, when irradiated uniformly from one side with accelerated electrons, may receive a maximum dose of only about 20 to 40 kGy; otherwise, the release liner has to be replaced owing to the unacceptable deterioration of the mechanical and antiadhesive properties. The maximum permissible absorbed radiation dose is dependent on the type of the PSA and of the release coatings.

Here too, a reduction in the unwanted effects can be achieved, at appropriate layer thicknesses, by means of a skillful choice of the accelerating voltage if the radiation dose in the release liner has already fallen significantly. However, in this case it must be borne in mind that the PSA layer facing the release liner must still receive a radiation dose which is sufficient for crosslinking.

When a double-sided adhesive tape comprising a backing with PSA compositions on both sides and of an antiadhesively treated release liner is irradiated symmetrically from both sides, it receives the full radiation dose. The same applies to what are known as transfer tapes, where the PSA to be crosslinked is coated onto a release liner without a further backing.

It is clear from the above that the necessary complexity for the crosslinking of double-sided adhesive tapes with electron beams becomes considerable when the radiation doses required to crosslink the PSA layer are so high that the mechanical and antiadhesive properties of the release liner are adversely affected to an unacceptably high degree, since then the release liner must be replaced by a new, unexposed liner, by relining.

The crosslinking of adhesive compositions on temperature-sensitive backings, such as unplasticized PVC or PP spunbondeds, for example, requires thermal crosslinking in a tunnel or with IR lamps. UV crosslinking at higher doses necessitates greater technological complexity or lower running speeds.

If the increase in the attainable cohesiveness of the adhesive films is not to be achieved by way of a correspondingly high radiation dose, then the high molecular weight of the adhesive can be attained by means of suitable polymerization techniques selected in accordance with the prior art.

Acrylic PSAs prepared in this way, however, possess a high resilience, which makes coating by standard methods such as multiroller application or die coating more difficult.

WO 97/15722 describes a process used to bring about relaxation of the adhesive film directly following its emergence from a single or multiple-manifold die. The disadvantage of this process is that the free path which the adhesive film emerging from the die requires in order to relax increases with rising molecular weight. This in turn has the consequence that the adhesive film pulls itself in to a greater or lesser extent, relative to the film width originally dictated by the exit width of the dies (a phenomenon known as neck-in). The consequence is that, in order to achieve required adhesive film coating widths, there is a need for die widths which must be made wider, by some extent, than is the case with the present invention, since in this case lower molecular weights may be compensated by higher radiation doses.

It is an object of the present invention to provide a method of producing a solvent-free pressure-sensitive adhesive coating on substrates, especially release-coated substrates, which avoids the disadvantages of the prior art and which permits cost-effective manufacture and the use of radiation-chemical crosslinking, especially with accelerated electrons or UV radiation, without the need to accept damage to the backing and to the release liner.

This object is achieved by a method as specified in the main claim. Advantageous embodiments of the method are the subject of the dependent claims.

The invention accordingly describes a method of producing a coating of solvent-free pressure-sensitive adhesive systems on substrates, especially release-coated substrates, in which the pressure-sensitive adhesive system is applied in one or more layers to a rotating roller by means of an adhesive applicator, the pressure-sensitive adhesive system on the roller is crosslinked in an irradiating means by means of high-energy radiation, specifically using electron beams (EB), UV or IR rays, and the roller is contacted with the substrate, so that the pressure-sensitive adhesive system is transferred from the roller to the substrate, and if desired is rolled up.

Typical irradiating means employed in the context of the inventive embodiment of the method are linear cathode systems, scanner systems or multiple longitudinal cathode systems, where the equipment in question comprises electron beam accelerators.

The acceleration voltages are situated in the range between 40 kV and 350 kV, preferably from 80 kV to 300 kV. The output doses range between 5 and 150 kGy, in particular from 20 to 90 kGy.

As UV crosslinking units it is possible in particular to employ two medium-pressure mercury lamps each with an output of 120 W/cm or one medium-pressure mercury lamp having an output of 240 W/cm. The doses set are preferably from 10 to 300 mJ/cm$^2$.

The contacting of the substrate takes place in particular by way of a second roller. Substrates used include papers, films, nonwovens and release-coated materials such as release papers, films, and the like.

The second roller, also referred to as the contact roller, preferably has a rubber coating and is pressed against the roller with a linear pressure of preferably from 50 to 500 N/mm, in particular from 100 to 200 N/mm. The contact roller preferably has a Shore hardness (A) of 40–100, in particular a Shore hardness of 60–80 shore (A). The substrate is preferably brought into contact with the roller in such a way that the speed of the roller surface coincides with that of the substrate. Where, however, it is intended that a reduction in thickness should take place along with the reception of the adhesive film, the substrate may also have a higher speed.

In a first advantageous embodiment, the roller is a steel roller, a chrome-plated steel roller, a rubber roller or a silicone rubber roller and/or is manufactured from elastic material. Furthermore, the roller may be smooth or may have a slightly structured surface. The smooth roller may preferably have a chrome coating. Optionally, the chrome-plated steel roller may possess a high-gloss-polished surface with a roughness $R_z<+/-1$ $\mu$m. The coating roller may, however, also be rubberized, preferably with a rubber hardness of from 40 to 100 shore (A), in particular with a hardness of 60–80 shore (A). The roll coating may, in accordance with the prior art, comprise EPDM, Viton or silicone rubber, or other elastic materials.

It has also proven advantageous for the roller to be temperature-controllable, preferably in a range from –10° C. to 200° C., with very particular preference from 2° C. to 50° C.

The placement of the pressure-sensitive adhesive system onto the roller takes place in particular by means of a single or multiple-manifold die or a slot die.

In a further advantageous embodiment of the method, before the pressure-sensitive adhesive system is applied to the rotating roller, a fluid film is brought onto the roller, so that the fluid film is located between the roller and the pressure-sensitive adhesive system.

The fluid film is preferably water and/or distilled water, with or without additions such as alcohol, wetting agents and/or agents insensitive to the adhesive formulation, such as plasticizers or liquid aging inhibitors.

To achieve uniform wetting, the surface tension of the fluid should be lower than the surface tension of the roller to be wetted.

The fluid-laden roller is preferably coated contactlessly with the adhesive film emerging from the die. The distance of the die from the roller may be preferably from 0 to 60 mm, in particular from 1 to 10 mm.

Furthermore, the fluid applicator should also be temperature-controllable, in order to bring agents which are present in but insensitive to the adhesive formulation to temperatures associated with desired fluid properties.

The fluid may be wiped on or carried on; it is, however, also possible for the fluid to be brought onto the roller contactlessly, by spraying, for example.

In another advantageous embodiment of the invention, the radiation-chemical crosslinking is assisted by thermal crosslinking, which can be regulated by way of the temperature of the coated roller.

As the pressure-sensitive adhesive (PSA) system, use is made in particular of acrylic, natural rubber, synthetic rubber or EVA adhesives.

Examples of low molecular mass acrylic hotmelts employed include copolymers of (meth)acrylic acid and esters thereof having from 1 to 25 carbon atoms, maleic, fumaric and/or itaconic acid and/or their esters, substituted (meth)acrylamides, maleic anhydride, and other vinyl compounds, such as vinyl esters, especially vinyl acetate, vinyl alcohols and/or vinyl ethers.

The acrylic hotmelts may further be blended with one or more additives such as aging inhibitors, crosslinkers, light stabilizers, ozone protectants, fatty acids, resins, plasticizers, and accelerators.

Furthermore, they may have been filled with one or more fillers such as fibers, carbon black, zinc oxide, solid microbeads, silica, silicates, and chalk, the addition of blocking-free isocyanates also being possible.

In the case of rubber/synthetic rubber as starting material for the adhesive, further variation possibilities exist, whether the said material is from the group of the natural rubbers or the synthetic rubbers or whether it comprises any desired blend of natural rubbers and/or synthetic rubbers, it being possible to select the natural rubber or the natural rubbers, in principle, from all available grades, such as, for example, crepe, RSS, ADS, TSR or CV grades, depending on the required purity and viscosity level, and it being possible to select the synthetic rubber or synthetic rubbers from the group consisting of randomly copolymerized styrene-butadiene rubbers (SBR), butadiene rubbers (BR), synthetic polyisoprenes (IR), butyl rubbers (IIR), halogentated butyl rubbers (XIIR), acrylic rubbers (ACM), ethylene-vinyl acetate (EVA) copolymers and the polyurethanes and/or blends thereof.

Also, preferably, it is possible to add thermoplastic elastomers with a weight fraction of from 10 to 50% by weight, based on the overall elastomer content, to rubbers in order to improve the processing properties.

As representatives, mention may be made at this point, in particular, of the particularly compatible styrene-isoprene-styrene (SIS) and styrene-butadiene-styrene (SBS) types. As tackifier resins to be added, it is possible without exception to use all known tackifier resins, including those described in the literature. As representatives, mention may be made of the rosins, their disproportionated, hydrogenated, polymerized, esterified derivatives and salts, aliphatic and aromatic hydrocarbon resins, terpene resins, and terpene-phenolic resins. Any desired combinations of these and other resins may be used in order to adjust the properties of the resultant adhesive composition in accordance with what is desired. Express reference may be made to the outline of the state of the art in the "Handbook of Pressure Sensitive Adhesive Technology" by Donatas Satas (van Nostrand, 1989).

As plasticizers which are likewise to be added, it is possible to use all plasticizing substances known from adhesive tape technology. These include, inter alia, the paraffinic and naphthenic oils, (functionalized) oligomers such as oligobutadienes, oligoisoprenes, liquid nitrile rubbers, liquid terpene resins, vegetable and animal oils and fats, phthalates, and functionalized acrylates.

In accordance with the present invention, radiation-sensitive and heat-sensitive backing materials do not come into contact with the radiation sources.

Relaxation of the adhesive film may likewise be forgone, since the adhesive film immediately following its emergence from the die is stabilized in its state by crosslinking on the roller. By means of the present invention, significantly higher radiation doses are possible in order to raise the cohesiveness of hotmelt PSAs to the desired level.

The reasons for the advantages of the present invention are that there is no damage whatsoever to the substrates and release liners used, as a result of physical crosslinking methods, and also that high molecular mass adhesive films exhibit a sufficiently low level of relaxation, if any, as a result of direct irradiation on the roller.

In the text below the intention, using a figure and a number of examples, is to illustrate the invention without, however, wishing to subject it to any unnecessary restriction.

Figure 1:
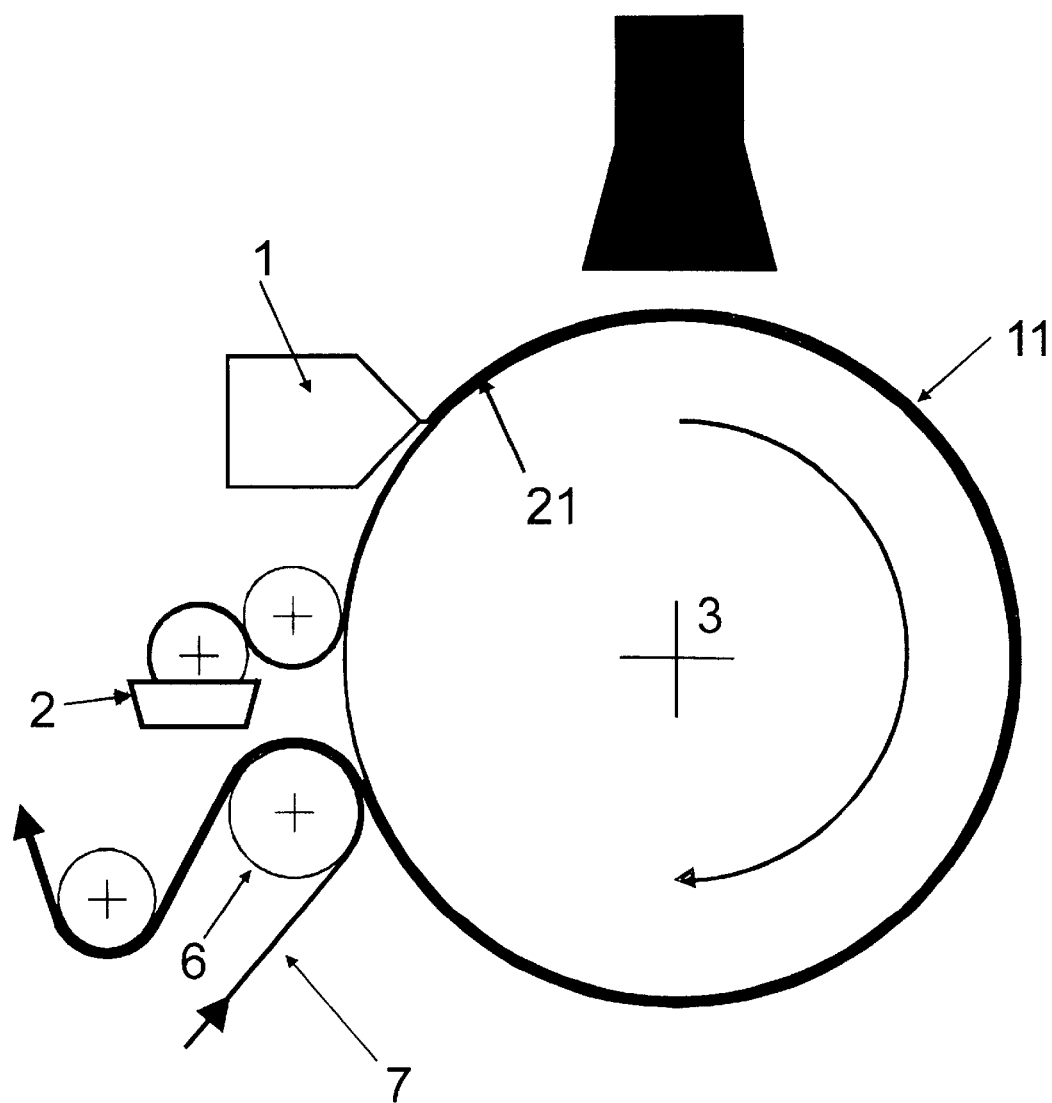
FIG. 1 shows an advantageous embodiment of the method.

The die (1) coats the pressure-sensitive hotmelt adhesive (11) onto a roller (3), which may be configured as a smooth roller or as a structured roller. Besides the use of the single die (1) depicted here, it is also possible to use slot dies or multiple-manifold dies with, for example, three or more individual layers.

The roller (3) is configured as a chrome-plated steel roller with a high-gloss-polished surface, specifically with a roughness $R_z < +-1 \mu m$.

The fluid film (21) is carried in premetered form onto the roller (3), evenly over the coating width, preferably by way of a roll applicator unit (2) configured in accordance with the prior art. The fluid (21)-laden roller (3) is coated, preferably contactlessly, with the adhesive film (11) emerging from the die (1). The distance of the die (1) from the roller (3) is 5 mm.

The adhesive film (11) placed floatingly onto the roller (3) is EB-crosslinked directly on the roller (3) by means of a radiation means (8). The choice of crosslinking technology depends on the adhesive system that is to be crosslinked.

Subsequently, the adhesive film (11) is received from the roller (3) by means of a contact roller (6). The contact roller (6) has a rubber coating and is pressed against the roller (3) at a linear pressure of 150 N/mm.

As the substrate (7) which receives the pressure-sensitive adhesive film, a release paper is supplied to the contact roller and the adhesive film (11) is thus transferred to the substrate (7).

The following examples serve for better comprehension of the present invention.

EXAMPLE 1

With the aid of a single-screw extruder (UD:27), an acrylic hotmelt pressure-sensitive adhesive, as described in DE 39 42 232 or DE 43 13 008, was coated onto a smooth roller at a temperature of 90° C. using a single-manifold extrusion die (manufacturer: Breyer), working width 350 mm. The fluid that wetted the smooth roller was water. The temperature of the smooth roller was 10° C. The distance of the die from the roller was 2 mm.

An adhesive film with a thickness of 50 $\mu$m was placed onto the smooth roller and crosslinked directly on the smooth roller at an acceleration voltage of 180 kV and a set dose of 80 kGy. By way of the web-guiding contact roller, the system was then transferred to a 12 $\mu$m corona-pretreated PET film. The exposed side of the adhesive was subsequently lined with a double-sided release paper. In a second operation, the exposed PET film side was likewise transferred, by way of the contact roller, with a layer of adhesive composition which was coated and crosslinked in accordance with the invention.

EXAMPLE 2

The acrylic hotmelt pressure-sensitive adhesive mentioned in Example 1 was coated contactlessly in a film thickness of 95 $\mu$m onto the water-wetted smooth roller, under the conditions specified in Example 1, and directly on the smooth roller was EB-crosslinked with an acceleration voltage of 230 kV and a set dose of 80 kGy. Thereafter, the crosslinked adhesive was transferred to a 40 $\mu$m PVC film. The exposed side of the adhesive was lined with a double-sided release paper. The same adhesive was crosslinked under the same conditions in accordance with the invention and then transferred to the exposed side of the PVC, and the double-sided adhesive tape thus produced was rolled up.

What is claimed is:

1. A method of producing a coating of solvent-free pressure-sensitive adhesive systems on substrates, in which the pressure-sensitive adhesive system is applied in one or more layers to a rotating roller, the pressure-sensitive adhesive system on the roller is crosslinked by high-energy radiation, and the roller is contacted with the substrate, to transfer the pressure-sensitive adhesive system from the roller to the substrate.

2. The method as claimed in claim 1, wherein -the roller is a steel roller, a chrome-plate steel roller, a rubber roller or a silicone rubber roller.

3. The method of claim 2, wherein said roller is manufactured from elastic material.

4. The method as claimed in claim 1, wherein the placement of the pressure-sensitive adhesive system onto the roller takes place with the aid of a single-manifold or multi-manifold die or of a slot die.

5. The method as claimed in claim 1, wherein the fluid applicator unit is temperature-controllable.

6. The method as claimed in claim 1, wherein acrylic, natural rubber, synthetic rubber or EVA adhesives are used as the pressure-sensitive adhesive system.

7. The method as claimed in claim 1, wherein before the pressure-sensitive adhesive system is applied to the rotating roller, a fluid film is applied to the roller, so that the fluid film is located between the roller and the pressure-sensitive adhesive system.

8. The method as claimed in claim 7, wherein the fluid film comprises water, distilled water or both, with or without additions selected from the group consisting of alcohol, wetting agents, plasticizers and liquid aging inhibitors.

9. The method of claim 1, wherein said roller is manufactured from elastic material.

10. The method as claimed in claim 1, wherein the roller is temperature-controllable in a range from –10° C. to 200° C.

11. The method of claim 3, wherein temperature range is 2°–50° C.

* * * * *

UNITED STATES PATENT AND TRADEMARK OFFICE
CERTIFICATE OF CORRECTION

PATENT NO.    : 6,472,025 B1                                           Page 1 of 1
DATED         : October 29, 2002
INVENTOR(S)   : Guldbrandsen et al.

It is certified that error appears in the above-identified patent and that said Letters Patent is hereby corrected as shown below:

<u>Colunm 6,</u>
Line 36, "-the roller" should read -- the roller --

Signed and Sealed this

Fifteenth Day of March, 2005

JON W. DUDAS
*Director of the United States Patent and Trademark Office*